United States Patent [19]

Kira et al.

[11] Patent Number: 4,803,581
[45] Date of Patent: Feb. 7, 1989

[54] THIN FILM YOKE-TYPE MAGNETORESISTIVE HEAD

[75] Inventors: Toru Kira, Tenri; Teiichi Miyauchi, Nara; Kiyohito Nakai; Kengo Shiiba, both of Tenri; Mitsuhiko Yoshikawa, Ikoma, all of Japan

[73] Assignee: Sharp Kabushiki Kaisha, Osaka, Japan

[21] Appl. No.: 27,088

[22] Filed: Mar. 16, 1987

Related U.S. Application Data

[63] Continuation of Ser. No. 575,928, Feb. 1, 1984, abandoned.

[30] Foreign Application Priority Data

Sep. 26, 1983 [JP] Japan .................................. 58-178909

[51] Int. Cl.⁴ ................................................ G11B 5/33
[52] U.S. Cl. ..................................... 360/113; 360/125; 324/252; 338/32 R
[58] Field of Search ........................ 360/113, 125–127, 360/119; 324/252; 338/32 R

[56] References Cited

U.S. PATENT DOCUMENTS

| | | | |
|---|---|---|---|
| 4,051,542 | 9/1977 | Kanai .................................... | 360/113 |
| 4,127,884 | 11/1978 | Nouichi et al. ...................... | 360/119 |
| 4,318,148 | 3/1982 | Kaminaka et al. ................... | 360/127 |
| 4,353,102 | 10/1982 | Kanai et al. ......................... | 360/126 |
| 4,425,593 | 1/1984 | Postma ................................. | 360/113 |
| 4,613,918 | 9/1986 | Kanai et al. ......................... | 360/113 |

FOREIGN PATENT DOCUMENTS

| | | | |
|---|---|---|---|
| 0091812 | 10/1983 | European Pat. Off. ............ | 360/113 |
| 58-115621 | 7/1983 | Japan .................................. | 360/113 |
| 58-115620 | 7/1983 | Japan .................................. | 29/603 |

OTHER PUBLICATIONS

Smith, "Magnetoresistive Magnetic Head", IBM Tech. Disc. Bull., vol. 18, No. 1, Jun. 1975.

Primary Examiner—John H. Wolff
Attorney, Agent, or Firm—Birch, Stewart Kolasch & Birch

[57] ABSTRACT

A thin film magnetic head including a lower yoke made of magnetic material having a high permeability, a magnetoresistive element and an upper yoke for transmitting magnetic flux to the magnetoresistive element. The upper yoke overlaps, at its rear end portion, a front end portion of the magnetoresistive element, while the lower yoke is formed, at its portion confronting the magnetoresistive element, with a groove such that the magnetoresistive element overlaps, at its rear end portion, the lower yoke.

7 Claims, 2 Drawing Sheets

THIN FILM YOKE-TYPE MAGNETORESISTIVE HEAD

This application is a continuation, of application Ser. No. 575,928 filed on Feb. 1, 1984, now abandoned.

The present invention generally relates to a magnetic head and more particularly, to a thin film magnetic head for detecting signals recorded on a magnetic recording medium by the use of a magnetoresistive element (referred to as "an MR element", hereinbelow) obtained on the basis of magnetoresistive effect of a ferromagnetic thin film.

It is already known that thin film magnetic heads provided with MR elements, (hereinbelow, referred to as "MR heads"), possess many advantages over inductive magnetic heads. Namely, the MR heads have such an advantage that, since the MR heads are arranged to convert change in resistance into change in voltage when subjected to a magnetic field of signals recorded on magnetic recording media, the MR heads are capable of reproducing the magnetic field of the signals independently of traveling speeds of the magnetic recording media. Furthermore, the MR heads have such an advantage that the MR heads have a higher output signal than those of the inductive magnetic heads in the case where the traveling speeds of the magnetic recording media are low.

Conventionally, in the MR heads, it has been usually so arranged that, since the MR elements are provided for use with magnetic recording media having high recording densities, the MR elements are disposed adjacent to the magnetic recording media so as to be exposed at front ends of the MR heads. Furthermore, one or two magnetic shields made of magnetic material having a high permeability are provided at one side or opposite sides of each of the MR elements. Meanwhile, in the case of known multitrack MR heads, a lower magnetic shield (a substrate) is made of NiZn ferrite or MnZn ferrite, while an upper magnetic shield is made of metallic magnetic material having a high permeability, such as permalloy, etc. in view of their excellent machinability. In order to adapt the shielded MR heads for use with the magnetic recording media having high recording densities (50 KBPI or more), a gap is required to be decreased, in length, to 0.5 μm or less. Thus, the shielded MR heads have such an inconvenience that, in the case where the MR element is placed in such a narrow gap, short-circuit of the MR element take place due to damp dust on the magnetic recording medium or minute peeling of the upper magnetic shield made of magnetic material having a high permeability when the front end of the shielded MR heads is brought into contact with the magnetic recording medium upon traveling of the magnetic recording medium, with the result that the output signal of the head is decreased.

Furthermore, the prior art MR heads have such a disadvantage that, in the case where the magnetic recording medium is made of electrically conductive ferromagnetic metal, short-circuit of the MR element is caused by the magnetic recording medium. Meanwhile, the shielded MR heads have been disadvantageous in that, since the thickness of the MR element is extremely reduced to 300 Å–700 Å approximately to improve its sensitivity, the MR element is poor in durability in the case where the MR element is provided so as to be exposed at the front end of each of the shielded MR heads.

In order to solve the above described disadvantages of the shielded MR heads, there has been proposed, as shown in FIG. 1, a thin film magnetic head provided with a flux guide (yoke) 2 for transmitting to an MR element 1 magnetic flux generated by a magnetic recording medium 5, (hereinbelow referred to as "a yoke type MR head"), in which the MR element 1 is spaced away from a front end of the yoke type MR head. The yoke 2 is composed of a front yoke 2A and a rear yoke 2B. The MR element 1 is interposed between the front yoke 2A and the rear yoke 2B made of magnetic material having a high permeability, which is spaced a spacing s from the magnetic recording medium 5.

More specifically, the front yoke 2A and the rear yoke 2B each have a thickness ty. The front yoke 2A includes a base portion 2A''' having a length th, an inclined portion 2A'' extending upwardly and rearward from a rear end of the base portion 2A''' at an angle α with an upper face of a lower yoke 4 and an upper portion 2A' having a length y1 such that the inclined portion 2A'' connects the base portion 2A''' and the upper portion 2A'. Meanwhile, the rear yoke 2B includes an inclined portion 2B'' extending upwardly and forwardly at the angle α with the upper face of the lower yoke 4 and an upper portion 2B' having a length y2. The upper portion 2A' of the front yoke 2A overlaps, at a rear end thereof, a front end of the MR element 1 through a length ovy1, while the upper portion 2B' of the rear yoke 2B overlaps, at a front end thereof, a rear end of the MR element 1 through a length ovy2. The base portion 2A''' of the front yoke 2A is spaced a gap g from the lower yoke 4, while the upper portion 2A' of the front yoke 2A and the upper portion 2B' of the rear yoke 2B are spaced a distance yh from the lower yoke 4. Furthermore, the upper portion 2A' of the front yoke 2A and the upper portion 2B' of the rear yoke 2B are spaced a clearance ovh from the MR element 1 having a length w and a film thickness t.

However, the known yoke type MR head has such a disadvantage that, since the MR element 1 is spaced apart from the magnetic recording medium 5, magnetic flux leaks from the front yoke 2A to the lower yoke 4 before reaching the MR element 1. In this connection, in the case where the gap g between the front yoke 2A and the lower yoke 4 is increased in length, the above described leakage of magnetic flux is decreased. However, in this case, such an inconvenience arises that resolution of the prior art yoke type MR head is decreased. Furthermore, the known yoke type MR head has been disadvantageous in that, since the front yoke 2A and the rear yoke 2B have the inclined portions 2A'' and 2B'', respectively, permeability may be decreased at the inclined portions 2A'' and 2B''. It is to be noted here that the rear yoke 2B is required to be provided for transmitting magnetic flux to a central portion of the MR element 1. In addition, the known yoke type MR head has such disadvantages that its structure is complicated and its output is small in the range of short wavelength.

Accordingly, an essential object of the present invention is to provide an improved yoke type MR head which is simplified in structure so as to yield a high reproducing output, with substantial elimination of the disadvantages inherent in conventional MR heads of this kind.

Another important object of the present invention is to provide an improved yoke type MR head of the above described type which is highly reliable in actual use and suitable for mass production at low cost.

In accomplishing these and other objects according to one preferred embodiment of the present invention, there is provided an improved thin film magnetic head comprising: a lower yoke which is made of magnetic material having a high permeability; a magnetoresistive element; and an upper yoke for transmitting magnetic flux to said magnetoresistive element, which is placed above said lower yoke so as to extend horizontally rearwardly from a front end of said thin film magnetic head such that said magnetoresistive element is interposed between said lower yoke and said upper yoke; said upper yoke overlapping, at a rear end portion thereof, a front end portion of said magnetoresistive element; said lower yoke being formed, at a portion thereof confronting said magnetoresistive element, with a groove such that said magnetoresistive element overlaps, at a rear end portion thereof, said lower yoke.

In accordance with the present invention, the yoke type MR head has been simplified in structure and its reproducing output is made larger than those of the prior art yoke type MR heads.

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

Figure 2:
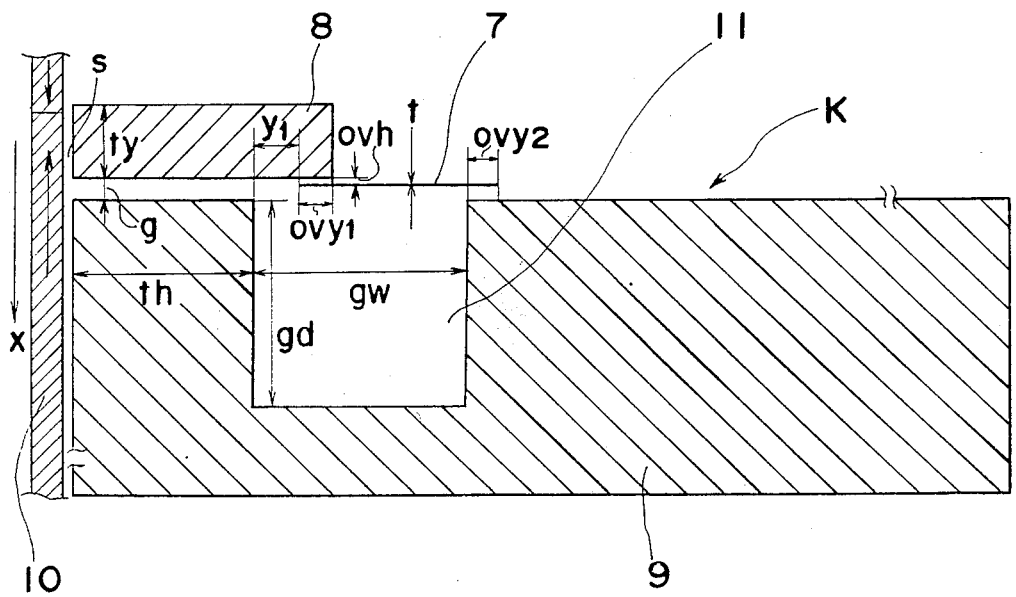
FIG. 2 is a cross-sectional view of a yoke type MR head according to the present invention.

Referring now to FIG. 2, there is shown a yoke type MR head K according to the present invention.

The yoke type MR head K includes an MR element 7 made of, for example, permalloy thin film, etc. and an upper yoke 8 for transmitting magnetic flux to the MR element 7, which is made of magnetic material having a high permeability, such as permalloy, etc. The yoke type MR head K further includes a lower yoke 9 made of magnetic material having a high permeability and a magnetic recording medium 10 such that the MR element 7 is interposed between the upper yoke 8 and the lower yoke 9. Furthermore, the lower yoke 9 is formed, at a portion thereof confronting the MR element 7, with a groove 11 having a width gw and a depth gd for preventing the lower yoke 9 from absorbing unnecessary magnetic flux such that a front end of the groove 11 is spaced a length from a front end of the lower yoke 9.

Figure 1:
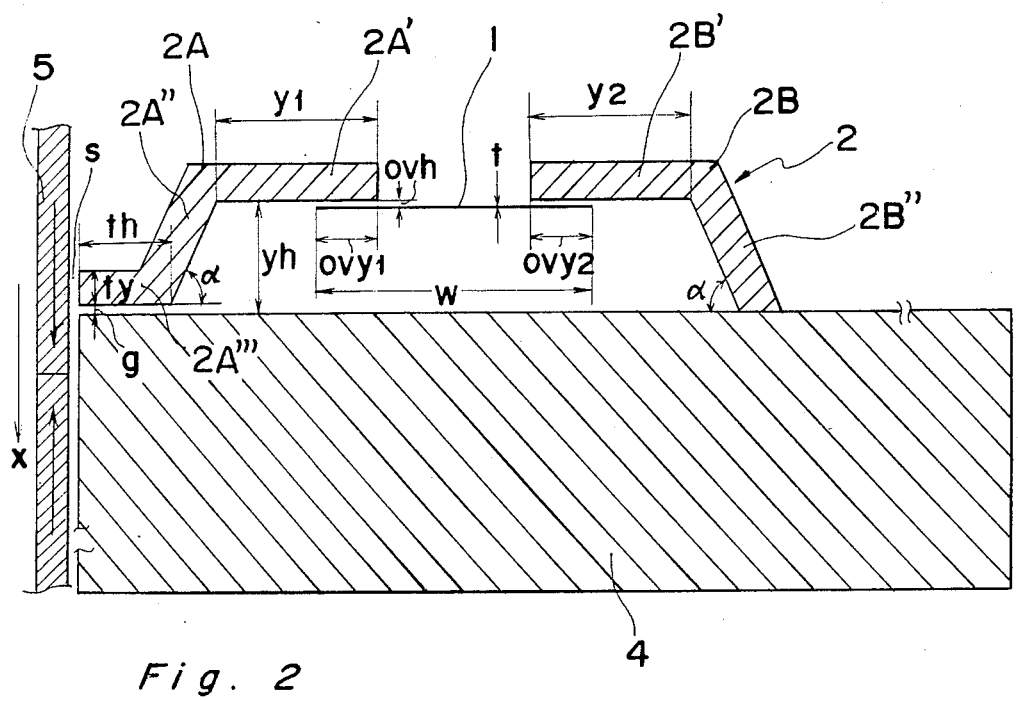
FIG. 1 is a cross-sectional view of a prior art yoke type MR head (already referred to)

More specifically, in a manner similar to the prior art yoke type MR head shown in FIG. 1, the lower yoke 9 is spaced a spacing s from the magnetic recording medium 10 and the upper yoke 8 has a thickness ty. The upper yoke 8 overlaps, at a rear end thereof, a front end of the MR element 7 through a length ovy1, while the MR element 7, in turn, overlaps, at a rear end thereof, the lower yoke 9 through a length ovy2. The upper yoke 8 is spaced a gap g from the lower yoke 9 and is spaced a clearance ovh from the MR element 7. Moreover, the front end of the groove 11 is spaced a length y1 from the front end of the MR element 7.

Thus, magnetic field generated at the magnetic recording medium 10 is transmitted from the upper yoke 8 to the MR element 7 via the overlap region of the upper yoke 8 and the MR element 7, extending over the length ovy1.

By the above described arrangement of the yoke type MR head K, since the upper yoke 8 is not required to be formed into a stepped shape shown in FIG. 1, the yoke type MR head K has been remarkably simplified in structure. As described above, the MR element 7 overlaps, at the rear end, the lower yoke 9 and is spaced apart, at a central portion thereof, from the lower yoke 9 by the groove 11, whereby leakage of magnetic flux from the MR element 7 is prevented.

Hereinbelow, such an advantage of the yoke type MR head K that the yoke type MR head K is capable of yielding an output larger than that of the prior art yoke type MR head shown in FIG. 1 will be described by calculating magnetization distribution on the MR element due to magnetic field generated from the magnetic recording medium.

In the case of response of the yoke type MR head to a sufficiently large recording wavelength on the magnetic recording medium, it is assumed that the magnetic recording medium is uniformly magnetized in a direction of thickness thereof due to arctangent magnetization transition and the magnetization is given by the equation:

$$M(x) = \frac{2}{\pi} Mr \tan^{-1}\left(\frac{x-p}{a}\right) \quad (1)$$

where:
Mr = residual magnetization on the magnetic recording medium,
a = transition length, and
p = value of position where the transition occurs.

It is possible to obtain magnetization distributions on the MR element and the yoke due to magnetic field generated through the magnetization transition by using a so-called integral method which is, for example, described in a report entitled "An analysis of the effect of shield length on the performance of magnetoresistive heads" (IE[3].TRANS. MAG. VOL. MAG-14(1978) p.515) by G. V. Kelley and R. A. Ketcham.

Furthermore, an output voltage V of the MR head is given, from the calculated magnetization distribution, by the equation:

$$V = Is\ R(x) \quad (2)$$

where:
Is = value of sense current flowing through the MR element, and
R(x) = resistance value of the MR element.

Resistivity $\rho$ of the MR element changes in a widthwise direction y of the MR element and is computed by the equation:

$$\rho(y) = \begin{cases} \rho_0 + \Delta\rho_{max}\left[1 - \frac{Mx^2 + My^2}{Ms^2}\right] & \ldots Mx^2 + My^2 < Ms^2 \\ \rho_0 & \ldots Mx^2 + My^2 = Ms^2 \end{cases} \quad (3)$$

where:
$\rho_0$ = resistivity at the time of saturation $(Mx^2 + My^2 = Ms^2)$ of magnetization on the MR element, and
$\Delta\rho_{max}$ = maximum value of change in the resistivity $\rho$.

In the case where the MR element is made of $Ni_{81}Fe_{19}$ and has a film thickness of about 500 Å, $\rho_0 = 35 \times 10^{-6}$ ohm-cm and a maximum change ratio $\Delta\rho_{max}/\rho_0 = 0.02$ are obtained.

Meanwhile, the above described resistance value R(x) of the MR element is given by the equation:

$$R(x) = \frac{v}{tw}\left[\int_{\text{front end of MR element}}^{\text{rear end of MR element}} \frac{1}{\rho(y)} dy\right]^{-1} \quad (4)$$

where:
v = track width of the MR element,
w = width of the MR element, and
t = film thickness of the MR element.

A resistance change ratio $$\frac{\Delta R}{Ro}$$

excluding its DC component is given by the equation:

$$\frac{\Delta R}{Ro} = \frac{1}{\rho o}\left[\int_{\text{front end of MR element}}^{\text{rear end of MR element}} \frac{1}{\rho(y)} dy\right]^{-1} - 1 \quad (5)$$

where:

$$Ro = \rho o \frac{v}{tw}.$$

It is supposed that the above described resistance change ratio $$\frac{\Delta R}{Ro}$$

is approximately proportional to values of magnetization on the MR element.

Hereinbelow, magnetization characteristics of the yoke type MR head K (FIG. 2) of the present invention will be described in comparison with those of the prior art yoke type MR head shown in FIG. 1.

The earlier described dimensions of the prior art yoke type MR head and the yoke type MR head K are set as shown in Table 1 below.

TABLE 1

|  | g | ty | th | α | y1 | yh | ovy1 | ovy2 |
|---|---|---|---|---|---|---|---|---|
| Prior Art | 0.3 | 2 | 5 | 71° | 7.5 | 6 | 4 | 4 |
| Present Invention | 0.3 | 2 | 5 |  | 2.5 |  | 2.5 | 2.5 |
|  | w | t | ovh | y2 | s | gd | gw |  |

TABLE 1-continued

| Prior Art | 15 | 0.05 | 0.1 | 7.5 | 0.3 |  |  |
| Present Invention | 15 | 0.05 | 0.1 |  | 0.3 | 15 | 15 |

It is to be noted here that the dimensions in Table 1 are expressed in μm except for the angle α.

Figure 3:
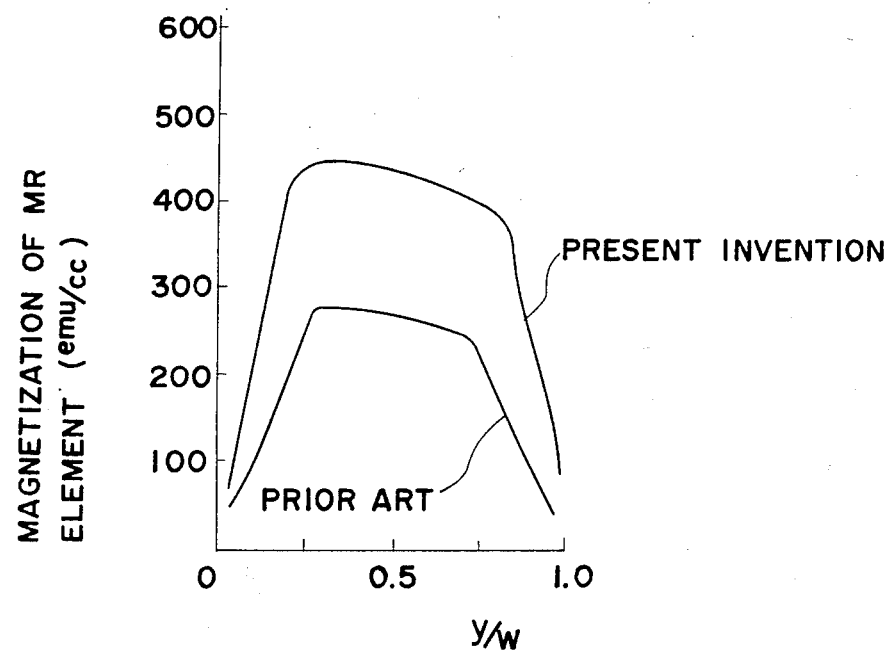
FIG. 3 is a graph explanatory of magnetization characteristics of the prior art yoke type MR head of FIG. 1 and the yoke type MR head of the present invention shown in FIG. 2.

Meanwhile, on the assumption that residual magnetization Mr of the magnetic recording medium is 123.83 emu/cc, the transition length a is 0.5 μm, the magnetic recording medium has a thickness of 0.5 μm, and magnetic susceptibilities of the upper yoke, the MR element and the lower yoke made of magnetic substrate having a high permeability are 227.4, 199 and 144, respectively, magnetization on the MR element was calculated. It will be seen from FIG. 3, illustrating magnetization distributions of the prior art yoke type MR head and the yoke type MR head K of the present invention, that magnetization of the yoke type MR head K of the present invention is larger, in value, than the prior art yoke type MR head by about 1.5. Namely, it can be understood that a reproducing output of the yoke type MR head K is far larger than that of the prior art yoke type MR head.

As is clear from the foregoing description, in accordance with the present invention, the yoke type MR head having a simple structure can be manufactured with much ease and its reproducing output is made far larger than those of the prior art yoke type MR heads.

Furthermore, in accordance with the present invention, since the MR head of the present invention is of a yoke type, the MR element is not exposed at the front end of the MR head, whereby such undesirable phenomena as generation of noise from the MR element and deterioration of the MR element can be eliminated.

Although the present invention has been fully described by was of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:
1. A thin film magnetic head comprising:
   a lower yoke which is made of magnetic material having a high permeability;
   a magnetoresistive element having upper and lower major surfaces, a front end portion facing a magnetic recording medium and a distal end portion spaced from said front end; and
   an upper yoke, having a rectangular cross section, for transmitting magnetic flux to said magnetoresistive element, which is placed above said lower yoke so as to extend from the recording medium facing portion of said thin film magnetic head such that said magnetoresistive element is interposed between said lower yoke and said upper yoke;
   said upper yoke overlapping only said front end portion of said magnetoresistive element such that the upper major surface at said distal end portion thereof is free of any magnetic material;

said lower yoke being formed, at a portion thereof confronting the lower major surface of said magnetoresistive element, with a groove such that the distal end portion of said magnetoresistive element overlaps said lower yoke;

said upper and lower yokes separated by a magnetic gap of a width enabling detection of magnetization in a longitudinal direction.

2. A thin film magnetic head as claimed in claim 1, wherein said groove is so formed as to extend substantially along said magnetoresistive element.

3. A thin film magnetic head as claimed in claim 2, wherein said groove is so formed as to extend forwardly of said front end portion of said magnetoresistive element.

4. A thin film magnetic head as claimed in claim 1, wherein said groove is so formed as to extend substantially along said magnetoresistive element.

5. A thin film magnetic head as claimed in claim 4, wherein said groove is so formed as to extend forwardly of said front end portion of said magnetoresistive element.

6. A thin film magnetic head as claimed in claim 1, wherein said upper yoke is made of magnetic material having a high permeability.

7. A thin film magnetic head comprising:
a lower yoke which is made of magnetic material having a high permeability;
a magnetoresistive element having upper and lower major surfaces, a front end portion facing a magnetic recording medium and a distal end portion spaced from said front end; and
an upper yoke for transmitting magnetic flux to said magnetoresistive element, which is placed above said lower yoke so as to extend from the recording medium facing portion of said thin film magnetic head such that said magnetoresistive element is interposed between said lower yoke and said upper yoke, said upper and lower yokes having a magnetic gap defined therebetween having a width enabling detection of magnetization in a longitudinal direction;
said upper yoke overlapping only said front end portion of said magnetoresistive element such that the upper major surface at said distal end portion thereof is free of any magnetic material;
said lower yoke being formed, at a portion thereof confronting the lower major surface of said magnetoresistive element, with a groove such that the distal end portion of said magnetoresistive element overlaps said lower yoke.

* * * * *